(12) United States Patent
Okunlola et al.

(10) Patent No.: US 11,363,070 B2
(45) Date of Patent: Jun. 14, 2022

(54) PREVENTING CROSS-SITE REQUEST FORGERY

(71) Applicant: INTERNATIONAL BUSINESS MACHINES CORPORATION, Armonk, NY (US)

(72) Inventors: Olanrewaju O. Okunlola, Fredericton (CA); Christopher C. Fraser, Noonan (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 16/734,334

(22) Filed: Jan. 5, 2020

(65) Prior Publication Data

US 2021/0211469 A1 Jul. 8, 2021

(51) Int. Cl.
*H04L 9/40* (2022.01)

(52) U.S. Cl.
CPC .......... *H04L 63/20* (2013.01); *H04L 63/0807* (2013.01); *H04L 63/102* (2013.01)

(58) Field of Classification Search
CPC .... H04L 63/20; H04L 63/0807; H04L 63/102
See application file for complete search history.

(56) References Cited

U.S. PATENT DOCUMENTS

| | | | |
|---|---|---|---|
| 8,495,137 B2 | 7/2013 | Amit et al. | |
| 8,505,106 B1 * | 8/2013 | Bhosle | H04L 9/3213 726/28 |
| 8,640,216 B2 | 1/2014 | Anderson et al. | |
| 8,813,237 B2 | 8/2014 | Amit et al. | |
| 8,856,869 B1 * | 10/2014 | Brinskelle | H04L 63/166 726/2 |
| 9,003,540 B1 * | 4/2015 | Johansson | H04L 63/0807 726/26 |
| 9,154,570 B2 | 10/2015 | Meliksetian et al. | |
| 9,191,405 B2 * | 11/2015 | Gallagher | H04L 63/08 |
| 9,282,088 B2 * | 3/2016 | Chin | H04L 63/0807 |
| 9,660,809 B2 | 5/2017 | Krapf et al. | |

(Continued)

FOREIGN PATENT DOCUMENTS

| | | |
|---|---|---|
| CN | 103312666 B | 3/2016 |
| CN | 106790007 A | 5/2017 |

(Continued)

OTHER PUBLICATIONS

Ziqing Mao, Ninghui Li, Ian Molloy, "Defeating Cross-Site Request Forgery Attacks With Browser-Enforced Authenticity Protection", Financial Cryptography and Data Security, Feb. 2009, pp. 238-255, Springer-Verlag Berlin, Heidelberg.

(Continued)

*Primary Examiner* — Jason Chiang
(74) *Attorney, Agent, or Firm* — Daniel J. Swirsky; AlphaPatent Associates Ltd.

(57) ABSTRACT

A computer security method including detecting a request, made by a computer software application, prior to transmission of the request to a recipient, accessing a predefined security requirement associated with the recipient, determining whether the predefined security requirement is met, and preventing at least a portion of the request from being transmitted to the recipient if the predefined security requirement is not met.

13 Claims, 4 Drawing Sheets

(56) References Cited

U.S. PATENT DOCUMENTS

| | | | |
|---|---|---|---|
| 9,906,517 B2 | 2/2018 | Dayka et al. | |
| 2009/0300359 A1* | 12/2009 | Gao | H04L 63/1441 713/171 |
| 2010/0333167 A1* | 12/2010 | Luo | H04L 63/20 726/1 |
| 2011/0131635 A1* | 6/2011 | Schneider | H04L 63/1441 726/5 |
| 2012/0137363 A1* | 5/2012 | Meliksetian | G06F 21/00 726/22 |
| 2013/0117817 A1* | 5/2013 | Gantman | H04L 63/1466 726/4 |
| 2013/0167214 A1* | 6/2013 | Sanno | H04L 63/1441 726/7 |
| 2014/0137189 A1* | 5/2014 | Hansen | G06F 21/51 726/3 |
| 2014/0189842 A1* | 7/2014 | Wang | H04L 63/0884 726/9 |
| 2014/0317738 A1* | 10/2014 | Be'ery | H04L 63/16 726/23 |
| 2015/0180857 A1* | 6/2015 | Schulman | H04L 63/0807 726/9 |
| 2016/0028707 A1* | 1/2016 | Feng | H04L 63/0807 726/9 |
| 2017/0149803 A1 | 5/2017 | Lo et al. | |
| 2018/0212965 A1* | 7/2018 | Kantorovskiy | H04L 67/146 |
| 2018/0302406 A1* | 10/2018 | Burckhardt | H04L 63/08 |
| 2018/0351986 A1 | 12/2018 | Johns | |
| 2019/0354709 A1* | 11/2019 | Brinskelle | H04L 63/0823 |
| 2019/0373016 A1* | 12/2019 | Kitchen | H04L 67/2842 |
| 2019/0379744 A1* | 12/2019 | Johns | H04L 63/168 |
| 2020/0213359 A1* | 7/2020 | Arbel | H04L 63/20 |
| 2021/0203641 A1* | 7/2021 | Mantin | H04L 63/0281 |

FOREIGN PATENT DOCUMENTS

| | | |
|---|---|---|
| CN | 107634967 A | 1/2018 |
| CN | 107682346 A | 2/2018 |

OTHER PUBLICATIONS

Jaya Gupta, Suneeta Gola, "Server Side Protection Against Cross Site Request Forgery Using CSRF Gateway", Journal of Information Technology & Software Engineering, 2016, vol. 6, Issue 3, Longdom Group SA, Brussels, Belgium.

Ouissem Ben Fredj, "Spheres: An Efficient Server-Side Web Application Protection System", International Journal of Information and Computer Security, Jan. 2019, vol. 11, No. 1, pp. 33-60, Inderscience Publishers, Geneva, Switzerland.

* cited by examiner

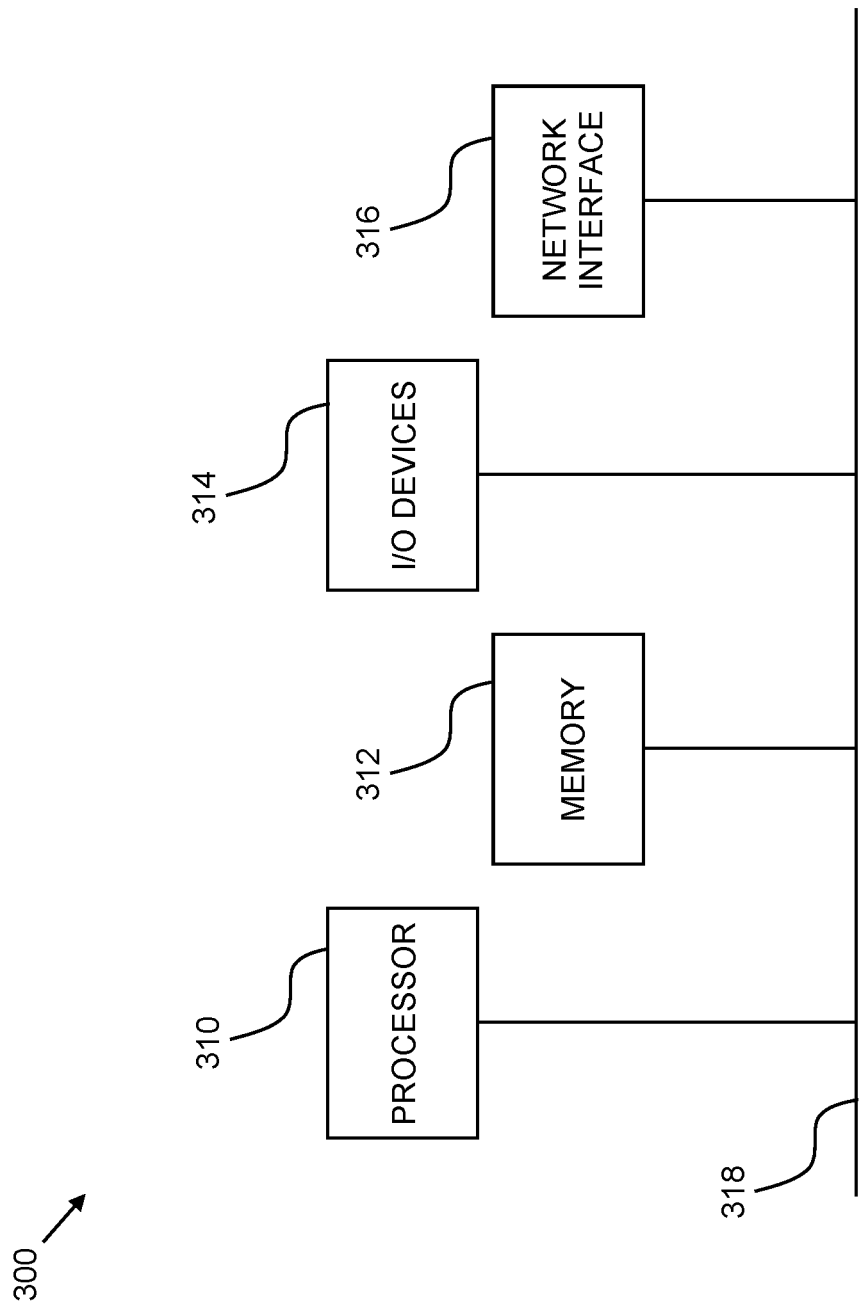

PREVENTING CROSS-SITE REQUEST FORGERY

BACKGROUND

Cross-site request forgery (CSRF) is a type of malicious exploit where unauthorized commands are unwittingly transmitted to a trusted website by an authorized user of the website. A common server-side defense against CSRF exploits involves the use of a unique, one-time security token that is embedded by a web server within a web page that is then served to a user. A subsequent communication that is sent by the user to the web server is checked by the web server to determine whether the security token is included in the communication. If the token is not included in the communication or is invalid, the communication is not processed further by the web server, and an error response is typically sent to the user. Unfortunately, this approach suffers from various known flaws and drawbacks, including token leakage, the need to maintain compatibility with different web frameworks, and the need to identify and configure the vulnerable web pages of a web site with this defense. A common client-side defense includes employing a browser plugin that uses heuristics to determine whether a request is safe to transmit to a trusted website. However, this approach also suffers from various known flaws and drawbacks, such as varying accuracy that results in false positives and false negatives.

SUMMARY

In one aspect of the invention a computer security method is provided including detecting a request, made by a computer software application, prior to transmission of the request to a recipient, accessing a predefined security requirement associated with the recipient, determining whether the predefined security requirement is met, and preventing at least a portion of the request from being transmitted to the recipient if the predefined security requirement is not met.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION

Figure 1A:
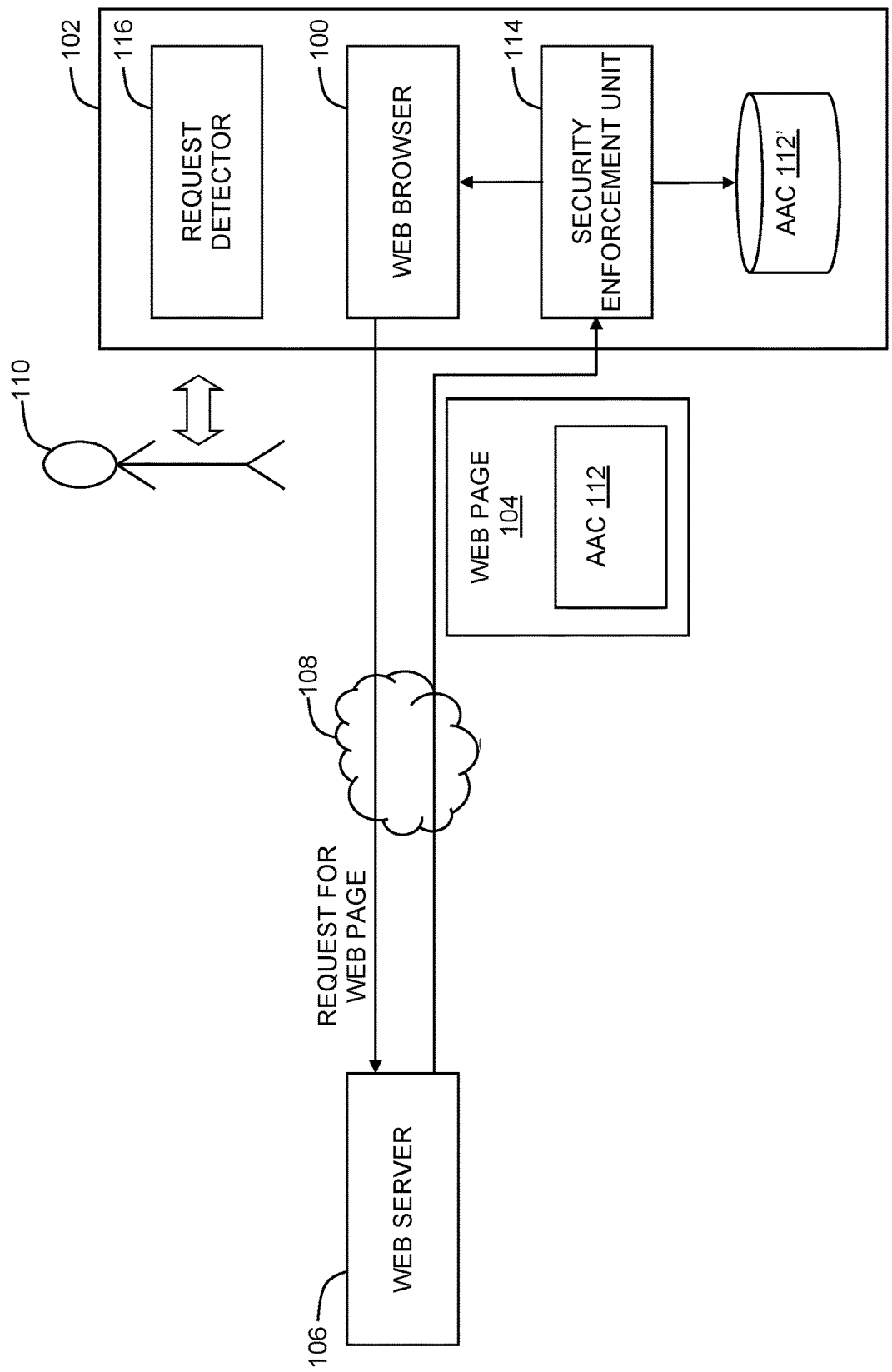
FIGS. 1A and 1B, taken together, is a simplified conceptual illustration of a computer security system for preventing cross-site request forgery, constructed and operative in accordance with an embodiment of the invention.
Figure 1B:
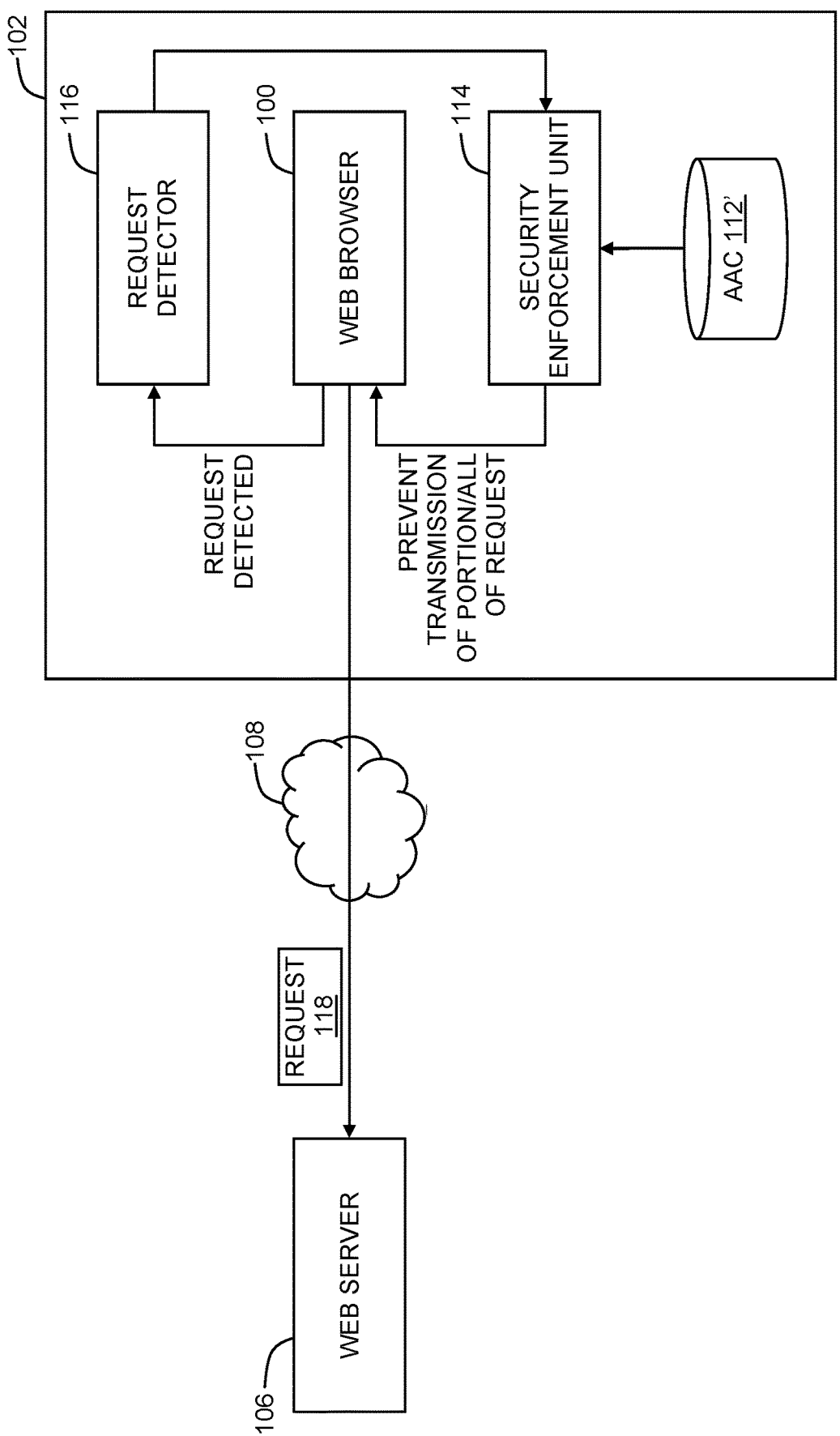

Reference is now made to FIGS. 1A and 1B which, taken together, is a simplified conceptual illustration of a computer security system for preventing cross-site request forgery, constructed and operative in accordance with an embodiment of the invention. In FIG. 1A, a computer software application, such as a web browser 100 hosted by a computer 102, is shown requesting a web page 104 from a web server 106 via a computer network 108, such as the Internet. Web page 104 may, for example, be a web page of a banking website of a bank at which a user 110 of computer 102 is an authorized user. In accordance with the invention, web server 106 configures web page 104 to include Authorization Acceptance Criteria (AAC) 112, such as in the form of an HTTP header, where AAC 112 includes one or more predefined security requirements that are to be evaluated by web browser 100 when sending subsequent requests to web server 106. Web server 106 serves web page 104 together with AAC 112 to computer 102 in response to the request by web browser 100 to receive web page 104.

A security enforcement unit (SEU) 114 is configured to detect the receipt of web page 104 at computer 102 and determine whether AAC 112 is present within web page 104. In one embodiment SEU 114 is integrated into web browser 100, such as an add-in or extension to web browser 100, or where web browser 100 is itself configured to act as SEU 114. In another embodiment, SEU 114 is hosted by computer 102 and is separate from web browser 100 yet able to monitor communications sent to and by web browser 100. SEU 114 is configured to remove AAC 112 from web page 104, if AAC 112 is present within web page 104, preferably before web browser 100 performs any other processing of web page 104. SEU 114 is configured to store AAC 112 as AAC 112', such as at computer 102, in association with the network domain of web server 106 from which AAC 112 was received, where SEU 114 determines the network domain in accordance with conventional techniques.

An exemplary version of AAC 112 is shown below:

```
AAC: {
    Applied-Cookies: login_authz, purchase_authz,
    Request-Source: SCRIPT,
    Origin-Whitelist:
        {https://origin1.mainsite.com/shopping/*,
        https://mainsite2.com/shipping/*},
    CSRF-Security-Element:
    {
        element-id: 'csrf-div',
        element-name: 'csrf-token',
        secret-value: '4060fgJKJ0jdnfk02vr',
        server-key: '0o2DKNdjk342M929482JJJ',
        framed-cse: SAMEORIGIN,
        empty-referrer: false
    }
}
```

The "Applied-Cookies" tag of AAC 112 lists one or more names of cookies, such as authorization cookies, that are to be removed from requests before they are transmitted by web browser 100 to web server 106, if any of the predefined security requirements of AAC 112 are not met.

The "Request-Source" tag of AAC 112 specifies browser-related security requirements for requests that are to be sent by web browser 100 to web server 106. In one embodiment, values of "Request-Source" include WINDOW, representing a security requirement that the request URL be entered into the search field of web browser 100; BOOKMARK, representing a security requirement that the request URL be selected from bookmarks of web browser 100; HOMEPAGE, representing a security requirement that the request URL be loaded from the default home page of web browser 100; CLICK, representing a security requirement that the request be the result of selection of an element on the current page; and SCRIPT, representing a security requirement that the request be launched by a JavaScript script, such as through an AJAX call.

The "Origin-Whitelist" tag of AAC 112 lists one or more network domains and/or sub-domains from which requests that are to be sent by web browser 100 to web server 106 are allowed to originate, particularly requests that require web server 106, as the recipient of the request, to authorize the sender of the request. The "Origin-Whitelist" tag is optional in various embodiments. The list may include wildcards and REST paths. If a web server that provides an AAC lists its own domain in "Origin-Whitelist", then the predefined security requirements of the AAC are applied even to requests that originate from that server.

The "CSRF-Security-Element" (CSE) tag of AAC 112 includes several parameters:

"element-id"—This specifies an HTML element ID associated with an encrypted token placed within web page 104. Any HTML element may be specified provided its position in the webpage follow the rules set out in the 'Framed-CSE' directive. This can be as generic as a 'div' or as specific as the ID of a particular input type. The web browser will look for the element with this ID and attempt to extract the token value specified in "element-name";

"element-name"—This specifies the name of a custom HTML attribute, within the element specified by "element-id", where the token value can be found;

"secret-value"—This specifies a value which was used to generate the encrypted token;

"secret-key"—This specifies the key value used to encrypt the secret value to generate the encrypted token placed within web page 104 and/or within cookies provided by web server 106 to web browser 100. Preferably, a one-way hashing algorithm, such as SHA256, is used to generate the encrypted token;

"framed-cse"—This specifies security requirements for requests originating from within an IFrame. In one embodiment, values of "framed-cse" include RESTRICT, representing a security requirement that requests not originate from within an IFrame; SAME-ORIGIN, representing a security requirement that where requests originate from within an IFrame, the IFrame must itself originate from the intended recipient of the request; and ALLOW-FROM, representing a security requirement that IFrame-based requests originate from a domain specified in "Origin-Whitelist";

"empty-referrer"—This specifies whether or not the referrer of the request which loaded the CSE can be empty, which may be determined by checking whether the 'referer field in the HTTP header of the current web page is empty.

The CSE tag may also include a "path" parameter that specifies a relative path (which may include wildcards and REST paths) within the website to which the CSE is applicable, where the web browser will only enforce the security requirements in the AAC and CSE for requests that are to be send to the specified path. If a request is to be sent by web browser 100 to a path that is not in the CSE, then cookies listed in "Applied-Cookies" will not be removed from the requests provided the other predefined security requirements of the AAC are met.

AAC 112 may also include an "Allow-Mode" tag that specifies whether or not requests that are to be sent by web browser 100 to web server 106 must originate from the same server that provided AAC 112, i.e., from web server 106. This is analogous to the cross-origin resource sharing (CORS) attribute 'SAME-ORIGIN' of the World Wide Web consortium standard, but "Allow-Mode" preferably applies to all HTTP request types including PUT and DELETE in addition to GET and POST. In one embodiment, values of "Allow-Mode" include RESTRICTED, representing a security requirement that requests that are to be sent to web server 106 must originate from web server 106; and PERMITTED, representing a security requirement that requests that are to be sent to web server 106 may originate from any source. In one embodiment, PERMITTED is the default value of "Allow-Mode."

In one embodiment, the "Allow-mode" value overrides the values in the CSE if the values are contradictory. For example, if the value of "framed_cse" is ALLOW-FROM but the value of "Allow-mode" is RESTRICTED, then "framed_cse" is overridden and set equal to SAMEORIGIN. In one embodiment, when "Origin-Whitelist" is specified, the other predefined security requirements of the AAC are applied except for the CSE, where only the "framed-cse" requirement is applied.

In FIG. 1B, a request detector 116 is configured to detect a subsequent request 118 prior to transmission of request 118 by web browser 100 to web server 106, or any other web server belonging to the same network domain as web server 106, via computer network 108. Request 118 may be any known type of request sent by web browsers to web servers, including requests to receive web pages or other information, and requests to perform transactions such as financial transactions, where request 118 originates within a web page loaded by web browser 100, such as in response to a user clicking on a link within another web page or email, or in response to a URL being entered into the browser's search field. Request detector 116 may be integrated into web browser 100 or separate therefrom as in the manner described hereinabove regarding SEU 114. SEU 114 is configured to identify from request 118 the intended recipient of request 118, being web server 106 in the example shown, where request 118 includes a network domain name identifying web server 106 as the recipient. SEU 114 is configured to access AAC 112' that is stored in association with the network domain of web server 106.

SEU 114 is configured to process the CSE tag parameters of AAC 112' as follows. SEU 114 determines whether the HTML element specified in the "element-name" CSE tag parameter exists on the web page from which request 118 originates, where the "element_id" in the CSE is used to locate the HTML, element with the name specified by the "element-name" attribute. If an element with the specified "element-name" is not found, this security requirement is not met. If an element with the specified "element-name" is found, SEU 114 extracts the encrypted token value from the "element-name" attribute. Thus, for example, in <div id="csrf-div" csrf-token="203nben30vn/vrj430vneni=="/> "csrf-div" is the "element-id", and "csrf-token" is the "element-name". SEU 114 uses the "server-key" provided in AAC 112' to encrypt the "secret-value" provided in AAC 112' using a one-way cryptographic hashing function, such as SHA256, to obtain a comparison encrypted token value. SEU 114 compares the comparison encrypted token value with the encrypted token value extracted from the "element-name" attribute. If the values match, this security requirement is met.

SEU 114 is configured to determine whether request 118 meets all predefined security requirements specified in AAC 112', including the security requirements of the CSE described above. SEU 114 is configured to prevent one or more portions of request 118 from being transmitted to web server 106 if any predefined security requirement specified in AAC 112' is not met, such as by removing from request 118 any cookies previously provided by web server 116 that are specified in the "Applied-Cookies" tag of AAC 112' and/or any other information identifying user 110 as an authorized user known to the recipient of request 118, or by preventing the transmission of request 118 altogether.

SEU 114 is preferably configured to replace AAC 112' with replacement versions of AAC 112 whenever their receipt from the same network domain is detected as described hereinabove.

Figure 2:
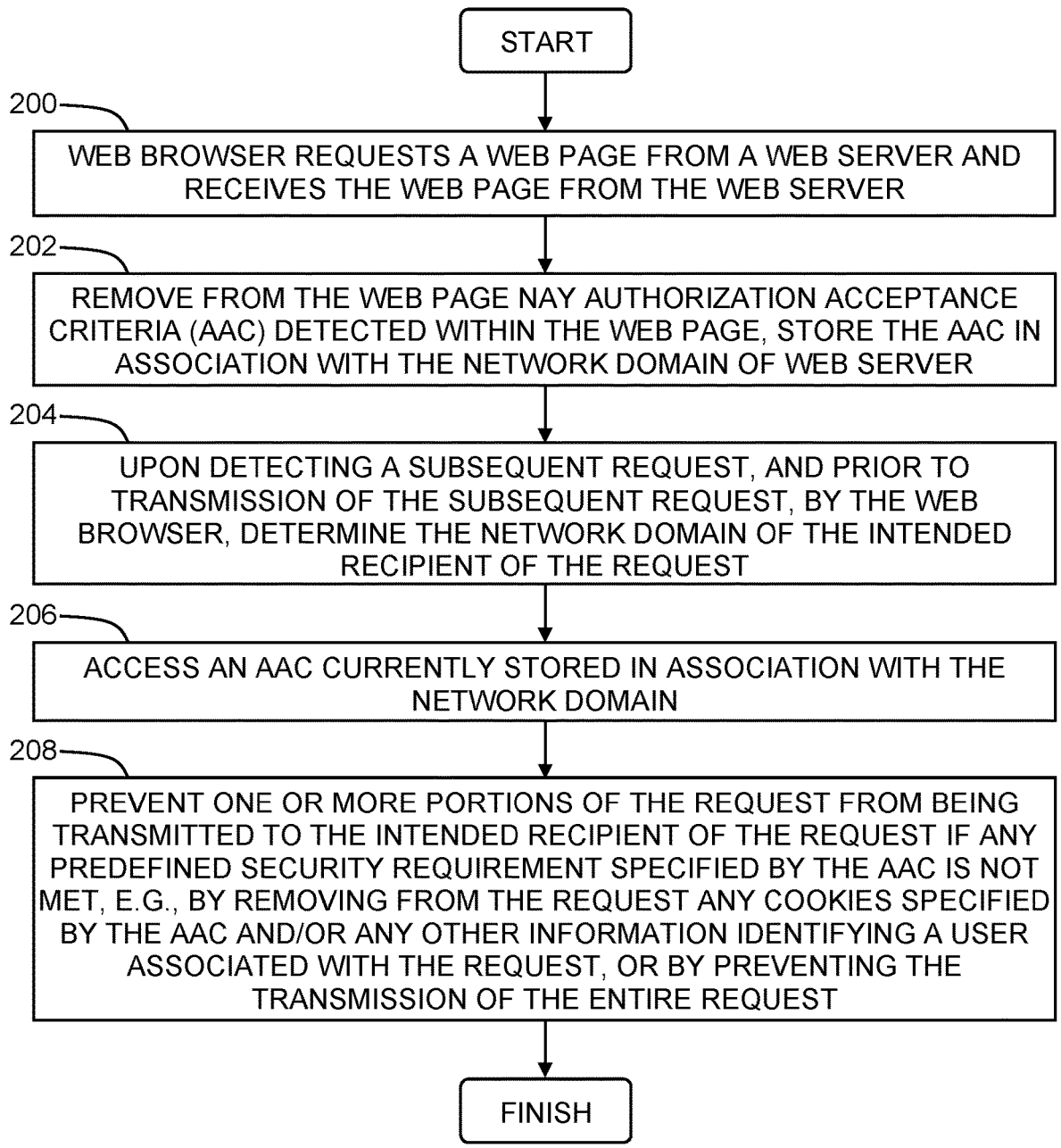
FIG. 2 is a simplified flowchart illustration of an exemplary method of operation of the system of FIGS. 1A and 1B, operative in accordance with an embodiment of the invention.

Reference is now made to FIG. 2, which is a simplified flowchart illustration of an exemplary method of operation of the system of FIGS. 1A and 1B, operative in accordance with an embodiment of the invention. In the method of FIG. 2, a web browser requests a web page from a web server and receives the web page from the web server (step 200). If Authorization Acceptance Criteria (AAC) are detected within the web page, the AAC are removed from the web page and stored in association with the network domain of web server (step 202). Upon detecting a subsequent request, and prior to transmission of the subsequent request, by the web browser, the network domain of the intended recipient of the request is determined (step 204), and if an AAC is currently stored in association with the network domain, it is accessed (step 206). If any predefined security requirement specified by the AAC is not met, one or more portions of the request are prevented from being transmitted to the intended recipient of the request, such as by removing from the request any cookies specified by the AAC and/or any other information identifying a user associated with the request 118, or by preventing the transmission of the request altogether (step 208).

Additional exemplary configurations of AAC 112, as described hereinabove with reference to FIGS. 1A and 1B, are provided below.

The following is an example of an AAC configured to prevent a login CSRF attack:

```
AAC: {
    Applied-Cookies: login_authz,
    Request-Source: SCRIPT, WINDOW
    Allow-Mode: RESTRICTED,
    CSRF-Security-Element:
    {
        element-id: 'csrf-div',
        element-name: 'csrf-token',
        secret-value: '4060fgJKJ0jdnfk02vr',
        server-key: '0o2DKNdjk342M929482JJJ',
        framed-cse: SAME-ORIGIN,
        empty-referrer: false
    }
}
```

This example specifies that the login_authz cookie is to be withheld from any request that did not originate from the server which set the AAC. Suppose an attacker is able to retrieve the login page in the response from the server which would contain the hashed token of a CSE element. The attacker can then scrape the CSE element, include it on their own webpage, and perform a new login request. While the browser will accept that the token verification is successful, the AAC 'allow-mode' directive will disallow sending the cookie from any site other than the same origin even if all the other directives are met.

The following is an example of an AAC configured to prevent server-side manipulation by an untrusted domain:

```
AAC: {
    Applied-Cookies: purchase_authz, logout_authz,
        user_authz
    Request-Source: SCRIPT,CLICK
    Allow-Mode: RESTRICTED,
    CSRF-Security-Element:
    {
        element-id: 'csrf-div',
        element-name: 'csrf-token',
        secret-value: '4060fgJKJ0jdnfk02vr',
        server-key: '0o2DKNdjk342M929482JJJ',
        framed-cse: SAME-ORIGIN,
        empty-referrer: false
    }
}
```

This example specifies that the three indicated cookies are to be withheld from any request that did not originate from the server which provided the AAC. Suppose an attacker is able to trick the user into sending a request to purchase an item, log out, or change their preferences to the legitimate website from the attacker's website. Given this AAC, the browser will check the origin webpage of the request, i.e., the attacker's webpage, to ensure it contains the token in the CSRF Security Element. Since it does not, the authorization cookie which allows a user to purchase items on the website is withheld from the request header. Once the server receives the request, it will be rejected as lacking the required authorization. This AAC also specifies that cross-origin requests are not permitted, as the website which originates a request must be the same one which directed the user to the web page. This AAC also specifies that requests can only be sent through a script, such as an AJAX call, rather than by typing in a URL into the browser's search field.

The following is an example of an AAC configured to allow cross-domain requests:

```
AAC: {
    Applied-Cookies: post_authz
    Request-Source: CLICK,
    Allow-Mode: PERMISSIVE,
    CSRF-Security-Element:
    {
        element-id: 'csrf-div',
        element-name: 'csrf-token',
        secret-value: '4060fgJKJ0jdnfk02vr',
        server-key: '0o2DKNdjk342M929482JJJ',
        framed-cse: SAME-ORIGIN,
        empty-referrer: false
    }
}
```

In this example, suppose a user lands on website A which supports making posts on behalf of the user to another third-party website B. An authorization request originating from website A is then made to website B to allow access to the requesting user's information. Once a permission is given to website A on behalf of website B to make requests on behalf of the user, website B can also inject an AAC and accompanying CSRF HTML element into website A to define the valid context of cross-origin requests. The above AAC specifies that the third-party website B will only allow a post authorization to be made on a webpage which contains the injected CSRF Security element, assuming the end user made the request by clicking on a link.

The following is an example of an AAC that specifies how two cooperating applications can communicate with each other:

```
AAC: {
    Applied-Cookies: banking-authz, banking-authz2
    Request-Source: SCRIPT,
    Allow-Mode: PERMISSIVE
    Origin-Whitelist:
        {https://origin1.domain.com/investing/*,
        https://domain2.com/banking/*},
    CSRF-Security-Element:
    {
        element-id: 'csrf-div',
        element-name: 'csrf-token',
        secret-value: '4060fgJKJ0jdnfk02vr',
        server-key: '0o2DKNdjk342M929482JJJ',
        framed-cse: SAME-ORIGIN,
        empty-referrer: false
    }
}
```

In this example, requests from origin1.domain.com/investing/* and domain2.com/banking/* are allowed to interact with each other. The scheme of the request—https—is also defined in the whitelist. This means that http-only requests will violate the AAC. Requests can only be sent from a script, and if the callers are within an iFrame, then the iFrame needs to have been created by the target server. If any of these predefined security requirements are not met, the indicated cookies defined will be withheld from the request. Furthermore, any other server attempting to make a cross-origin request must meet the specifications laid out in the CSE to prevent the indicated cookies from being withheld from the request.

The AAC in the following example is nearly identical to the AAC in the preceding example, but for allowing the servers specified in the whitelist to also frame the CSE element. This means that if the CSE is within an iFrame, the referrer of the iFrame must be from one of the domains in the whitelist.

```
AAC: {
    Applied-Cookies: banking-authz,banking-authz2,
    Request-Source: SCRIPT,
    Allow-Mode: PERMISSIVE,
    Origin-Whitelist:
        {https://origin1.domain.com/investing/*,
        https://domain2.com/banking/*},
    CSRF-Security-Element:
    {
        element-id: 'csrf-div',
        element-name: 'csrf-token',
        secret-value: '4060fgJKJ0jdnfk02vr',
        server-key: '0o2DKNdjk342M929482JJJ',
        framed-cse: ALLOW-FROM,
        empty-referrer: false
    }
}
```

Any of the elements shown in FIGS. 1A, 1B, and 2 are preferably implemented by one or more computers in computer hardware and/or in computer software embodied in a non-transitory, computer-readable medium in accordance with conventional techniques.

Referring now to FIG. 3, block diagram 300 illustrates an exemplary hardware implementation of a computing system in accordance with which one or more components/methodologies of the invention (e.g., components/methodologies described in the context of FIGS. 1A, 1B, and 2) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer security method comprising:
receiving at a computer a web page including a predefined security requirement, wherein the web page is received from a party to whom a user of the computer is known as an authorized user and in response to a first request sent to the party by a computer software application hosted by the computer;
removing the predefined security requirement from the web page before the computer software application performs any other processing of the web page;
storing the predefined security requirement in association with a network domain of the party that provided the predefined security requirement;
detecting a second request, made by the computer software application, prior to transmission of the second request;
identifying from content of the second request a network domain of an intended recipient of the second request;
accessing the predefined security requirement associated with the identified network domain of the intended recipient;
determining whether the predefined security requirement is met; and
preventing at least a portion of the second request from being transmitted to the intended recipient if the predefined security requirement is not met.

2. The method according to claim 1 wherein the computer software application is a web browser.

3. The method according to claim 2 wherein the detecting, accessing, determining, and preventing are performed by the web browser.

4. The method according to claim 1 wherein the preventing comprises removing the portion from the second request.

5. The method according to claim 4 wherein the portion identifies an authorized user known to the intended recipient.

6. The method according to claim 5 where the portion is an authorization cookie provided by the intended recipient prior to detection of the second request.

7. A computer security system comprising:
a security enforcement unit configured to
- receive at a computer a web page including a predefined security requirement, wherein the web page is received from a party to whom a user of the computer is known as an authorized user and in response to a first request sent to the party by a computer software application hosted by the computer,
- remove the predefined security requirement from the web page before the computer software application performs any other processing of the web page, and
- store the predefined security requirement in association with a network domain of the party that provided the predefined security requirement; and a request detector configured to detect a second request, made by the computer software application, prior to transmission of the second request, wherein the security enforcement unit is further configured to
- access the predefined security requirement associated with the identified network domain of the intended recipient,
- determine whether the predefined security requirement is met; and
- prevent at least a portion of the second request from being transmitted to the intended recipient if the predefined security requirement is not met.

8. The computer security system according to claim 7 wherein the computer software application is a web browser.

9. The computer security system according to claim 8 wherein the request detector and security enforcement unit are integrated into the web browser.

10. The computer security system according to claim 7 wherein the security enforcement unit is configured to remove the portion from the second request.

11. The computer security system according to claim 10 wherein the portion identifies an authorized user known to the intended recipient.

12. The computer security system according to claim 11 where the portion is an authorization cookie provided by the intended recipient prior to detection of the second request.

13. A computer program product for providing computer security, the computer program product comprising:
a non-transitory, computer-readable storage medium; and
computer-readable program code embodied in the storage medium, wherein the computer-readable program code is configured to
- receive at a computer a web page including a predefined security requirement, wherein the web page is received from a party to whom a user of the computer is known as an authorized user and in response to a first request sent to the party by a computer software application hosted by the computer,
- remove the predefined security requirement from the web page before the computer software application performs any other processing of the web page,
- store the predefined security requirement in association with a network domain of the party that provided the predefined security requirement,
- detect a second request, made by the computer software application, prior to transmission of the second request,
- identify from content of the second request a network domain of an intended recipient of the second request,
- access the predefined security requirement associated with the identified network domain of the intended recipient,
- determine whether the predefined security requirement is met, and
- prevent at least a portion of the second request from being transmitted to the intended recipient if the predefined security requirement is not met.

* * * * *